United States Patent Office 3,098,783
Patented July 23, 1963

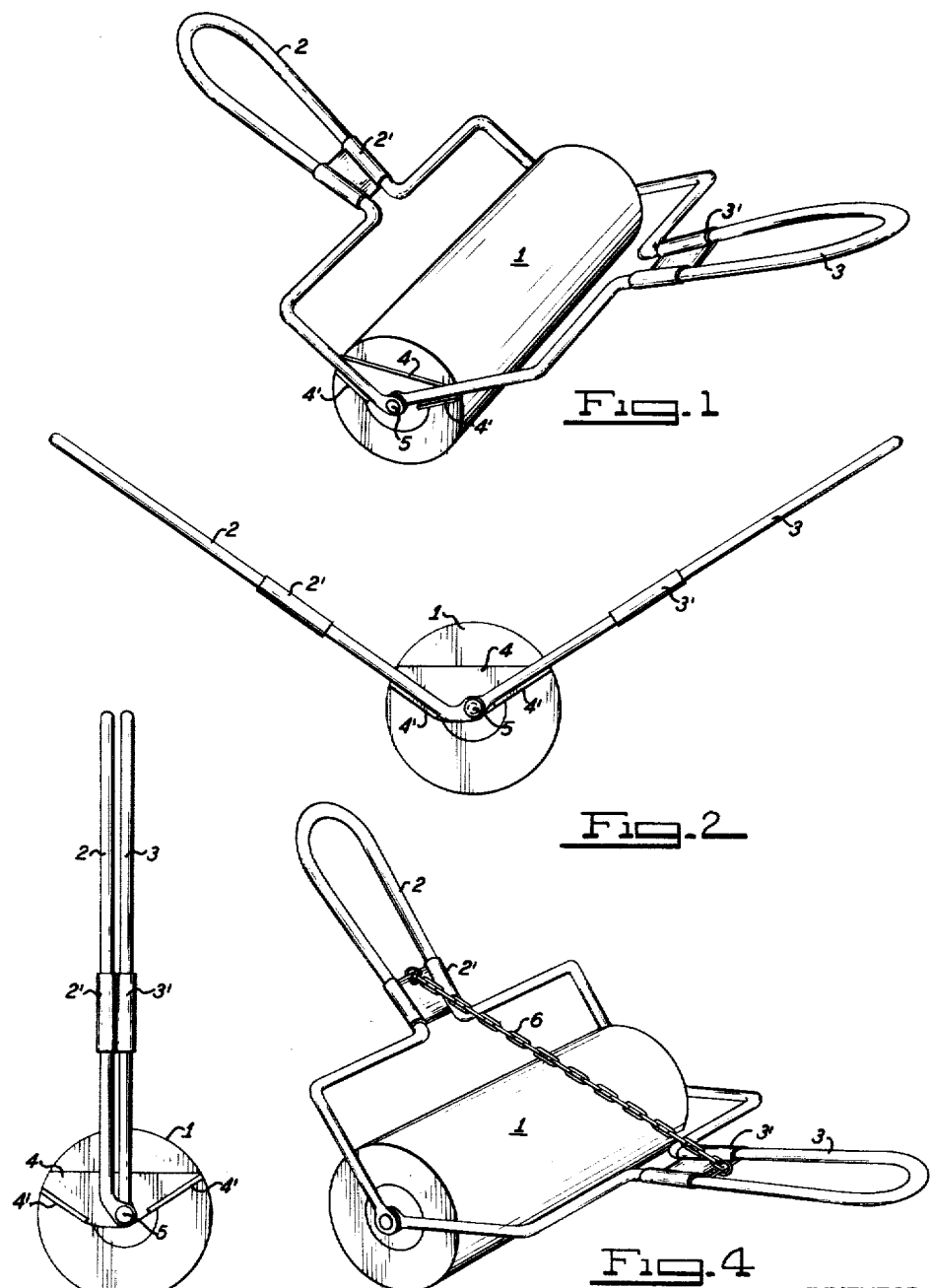

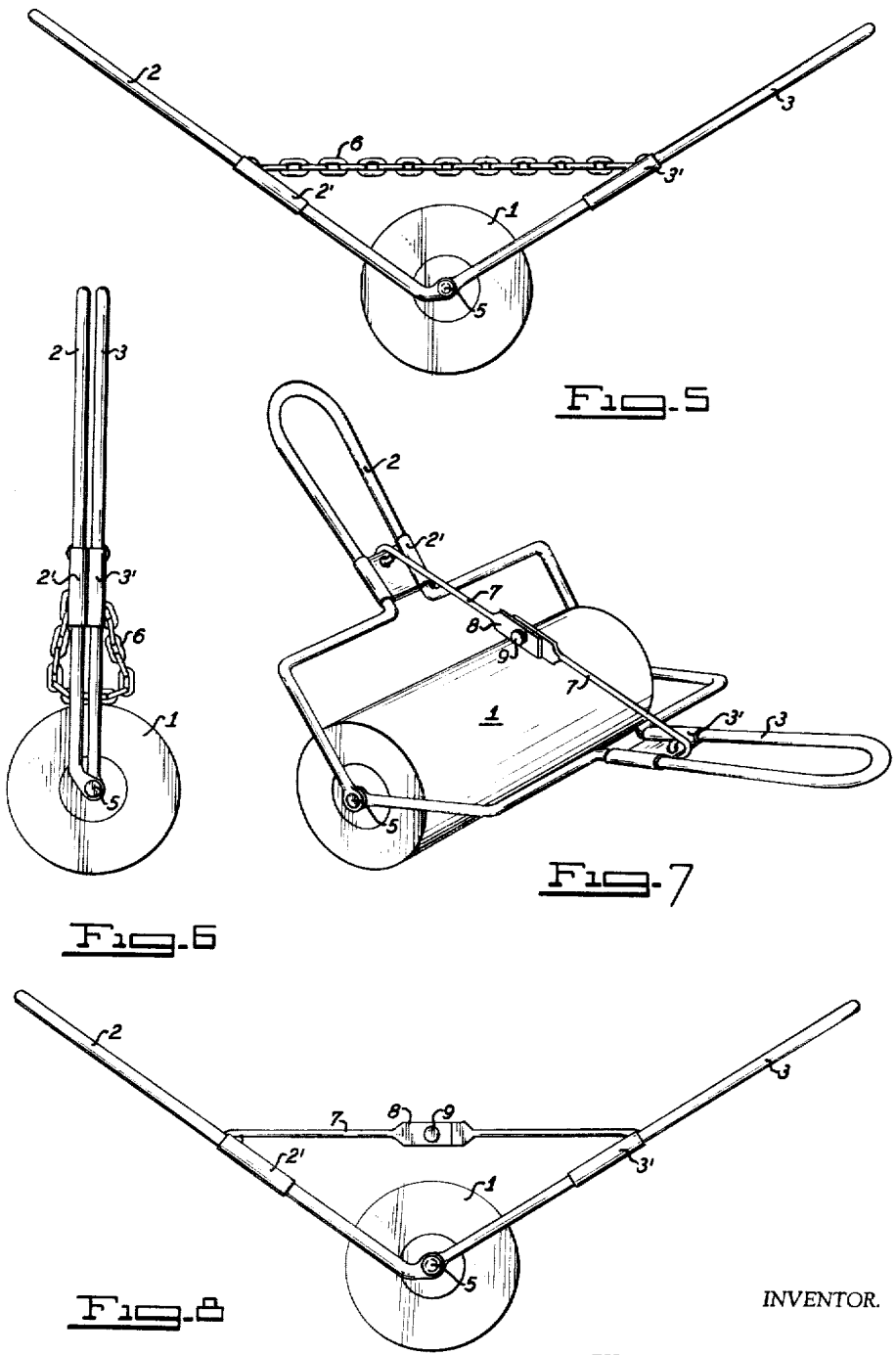

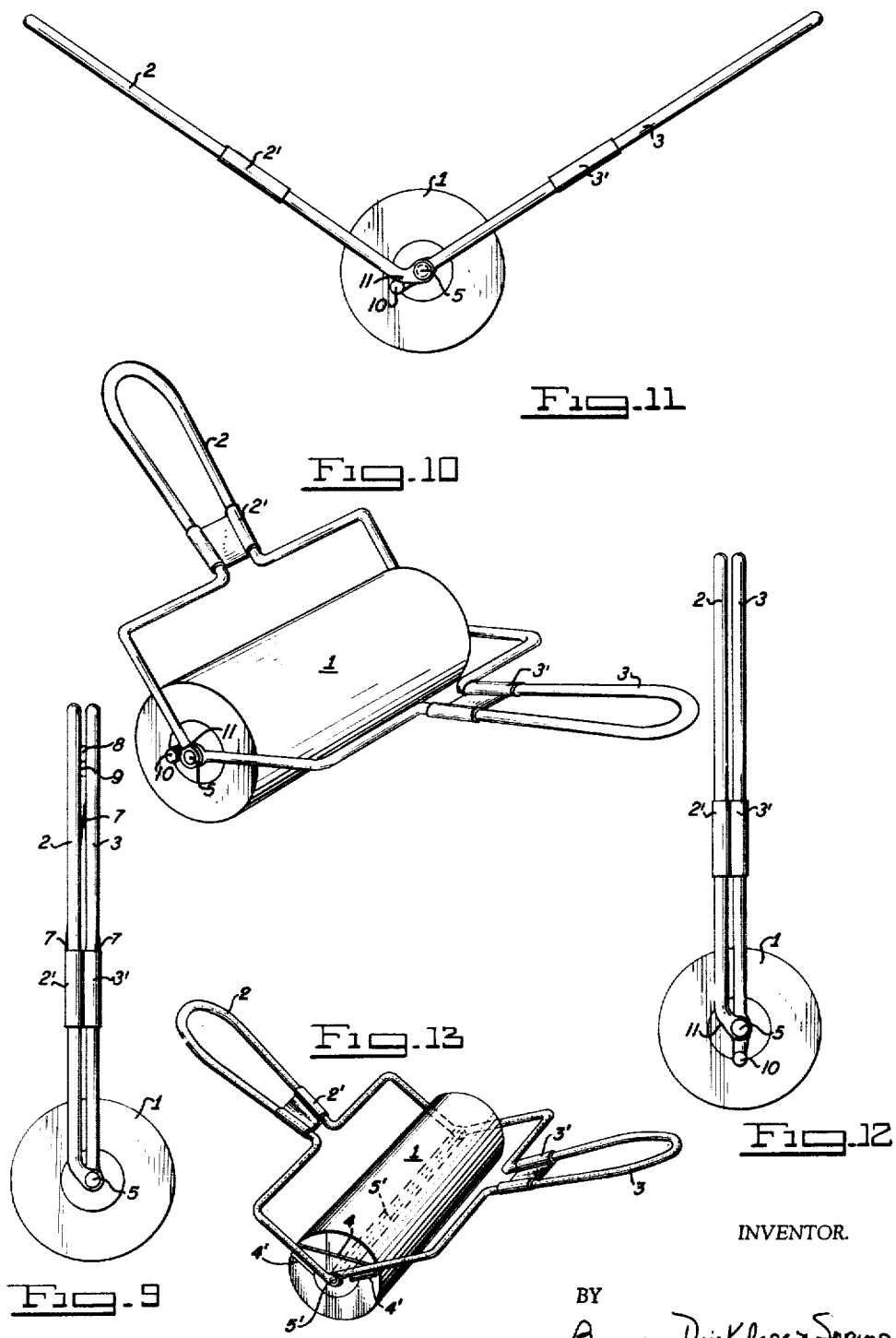

1

3,098,783
HAND PRESSURE ROLLER
Dieter Busch, Gelsenkirchen, Frido Eicher, Haan, Rhineland, and Anton Krämer, Dusseldorf, Germany, assignors to Henkel & Cie. G.m.b.H., Dusseldorf, Germany, a German corporation
Filed Feb. 12, 1959, Ser. No. 792,884
6 Claims. (Cl. 156—579)

The present invention relates to hand pressure rollers and more particularly to hand pressure rollers having two handles which may be grasped by the operator.

In gluing operations, such as where glue or other adhesive has been applied between two surfaces to be joined, it is often necessary to subject the area being joined together to a certain amount of pressure. This is most commonly accomplished by means of a hand-pressure roller, which exerts a short, but powerful rolling pressure along the area it passes over.

Conventional rollers are provided with only one handle which accordingly does not afford enough leverage whereby to exert strong pressures against the area upon which it acts.

In accordance with the present invention, it has been found that by providing two handles on a hand pressure roller, such as a roller having a hard-rubber rolling surface, the pressure which may be exerted can be considerably increased by the operator due to the increase in leverage which is thereby made possible. It is, therefore, an object of the present invention to provide a hand pressure roller having two handles which allow for greater leverage and thereby enable greater pressures to be exerted by the operator on the roller in use. It is a further object of the present invention to provide a hand pressure roller of the foregoing type wherein the two handles are collapsible so that the roller may be easily stored or conveniently placed in the worker's smock or apron. Other and further objects of the present invention will become apparent from a study of the within specification and the accompanying drawings in which FIGURE 1 shows a view in perspective of a hand roller in accordance with one embodiment of the invention wherein angle stop means are provided on either end of the roller to limit outward movement of the two handles. FIGURE 2 is a side view of the embodiment of FIGURE 1 showing the handles in open position. FIGURE 3 is a view similar to that of FIGURE 2 showing the handles in closed position. FIGURE 4 is a perspective view of another embodiment of a hand roller in accordance with the invention wherein chain cable means are provided for limiting the outward movement of the two handles. FIGURE 5 is a side view of the embodiment shown in FIGURE 4 wherein the handles are in open position. FIGURE 6 is a view similar to that of FIGURE 5 showing the handles in closed position. FIGURE 7 is a further embodiment of a hand roller in accordance with the invention, wherein hinged arm means are provided for limiting the outward movement of the two handles. FIGURE 8 is a side view of the embodiment shown in FIGURE 7 wherein the two handles are shown in open position. FIGURE 9 is a view similar to that in FIGURE 8 showing the two handles in closed position. FIGURE 10 is a further embodiment of the invention having

2 extension means on one of the handles for limiting the outward movement of said handle with respect to the other. FIGURE 11 is a side view of the embodiment shown in FIGURE 10 wherein the two handles are in open position. FIGURE 12 is a view similar to that in FIGURE 11 showing the handles in closed position, and FIGURE 13 is a further view schematically showing the embodiment using an axle as rotatable bearing surface for the handles.

In accordance with the present invention, a hand pressure roller is provided with two handles, preferably collapsible whereby when the two handles are in open position, the operator may have greater leverage enabling him to exert greater pressure over the surface on which the roller is passed and whereby the roller may be conveniently stored in collapsible condition.

The two handles are preferably limited in outward movement so that they form an angle of at most 120° with respect to one another. The two handles may be limited in outward movement by means of angle stops secured at the sides of the roller and cooperating with the handle portions adjacent thereto, by chain means or lockable hinged arm means connected at either end to said handles, or by various other means, such as a lateral extension of one of the handles adjacent the point where it is rotatably connected to the roller against which the corresponding portion of the other handle abuts when the two handles are in open position.

These various means for limiting the outward movement of the two handles are preferably provided so that the handles in open position form an angle of not more than substantially 120° with respect to one another. This permits an advantageous leverage action to be exerted during operation without the operator's hands coming in contact with the surface over which the roller is passed. It will be seen that an angle of about 120° will give best results.

The hand pressure roller of the present invention may be made of any desired material provided that it possesses the degree of strength necessary to withstand the pressures exerted by the operator. The roller itself may be made with a steel core over which a rubber covering layer is disposed. The two handles may be shaped from steel wire or may be composed of correspondingly shaped material such as wood or plastic.

Referring to the drawings, FIGURES 1, 2, and 3 show a hand roller in accordance with the present invention comprising roller 1, wire handles 2 and 3, laterally extending on either side of roller 1 and rotatably secured thereon by screw or rivet 5 at either side. Handles 2 and 3 are preferably reinforced by brackets 2' and 3' located at their mid portions. Angle brackets 4 are secured on either side of roller 1 with the apex of the angle located immediately below the points of connection of the two handles by screw 5 and with upwardly diverging side extensions 4' forming an angle of approximately 120° with respect to one another. Thus, when handles 2 and 3 are in open position, their outward movement is limited by extensions 4' against which they abut at their outermost displacement.

FIGURES 4, 5, and 6 are similar to FIGURES 1, 2 and 3. However, in this case, the outward movement of handles 2 and 3 is limited by a chain cable of predetermined distance which is connected at either end by suitable means to brackets 2' and 3'.

In FIGURE 7, the outward movement of handles 2 and 3 is limited by collapsible arm means 7 hingedly connected at 8 and secured at either end to handles 2 and 3 by suitable means on brackets 2' and 3'. The hinge connection at 8 is preferably provided with a locking screw 9 so that the handles may be locked in open position.

In FIGURE 10 a further embodiment is shown wherein the limiting of the outward movement of handles 2 and 3 is effected by means of an outward lateral extension 10 provided on handle 3 adjacent the point of rotatable connection of handle 3 to roller 1. Similarly, handle 2 is provided with an offset portion 11 which abuts extension 10 when said handles are in open position.

In each case it is seen that the two handles are pivotable with respect to one another about the axis of rotation of the roller and will, at most, define an angle of about 120°. This feature enables the operator to exert heavy pressures on the roller during operation with little chance that his hands, grasping the roller handles, will come in contact with the surface over which the roller passes.

It will be readily seen from FIGURE 13 that in place of screws or rivets 5 which serve as rotatable bearing surfaces for handles 2 and 3, an axle 5' may be provided which passes through the roller substantially along the axis of rotation thereof. The extensions of said axle on either side of the roller will thus comprise the rotatable bearing surfaces on which the handles may be mounted. Accordingly, the angle brackets 4 may also be mounted on said bearing surfaces in the same way.

Furthermore, one may advantageously omit the rotatable and pivotable connection on one side of the roller and the corresponding handle portions thereat where excessive pressures are not normally contemplated. By utilizing strong or reinforced material as above described for the handles, attachment thereof to the roller bearing on only one side will ordinarily be sufficient.

While the foregoing specification and accompanying drawings have been set forth for the purpose of illustration, it will be obvious to those skilled in the art that various modifications and changes may be made without departing from the spirit and scope of the invention which is to be limited only by the scope of the appended claims.

What is claimed is:

1. Hand pressure roller which comprises roller means, a pair of handle means, said handle means having additional means rotatably securing said handle means to said roller means and pivotally securing said handle means for movement outwardly and inwardly with respect to each other, at least a portion of said additional means rotatably abutting a portion of the roller means for transmitting pressure exerted on both the handle means to said roller means at said abutting portions, and means for limiting the outward pivotal movement of the handle means under the resultant pressure exerted on both the handle means, said means for limiting the outward pivotal movement including angle stop means on at least one side of said roller means, said stop means having two connected side means, the apex of said angle stop means being located immediately below the means for rotatably securing said handle means to said roller means, and the side means of said angle stop means being upwardly diverging, whereby said handle means will abut the corresponding side means of said angle stop means at their outermost position with respect to each other.

2. Hand pressure roller which comprises roller means, a pair of handle means, said handle means having additional means rotatably securing said handle means to said roller means and pivotally securing said handle means for movement outwardly and inwardly with respect to each other, at least a portion of said additional means rotatably abutting a portion of the roller means for transmitting pressure exerted on both the handle means to said roller means at said abutting portions, and means for limiting the outward pivotal movement of the handle means under the resultant pressure exerted on both the handle means, said means for limiting the outward pivotal movement including an outward lateral extension means on one side of said handle means adjacent the point of securing to said roller means in cooperation with an offset portion of the other of said handle means adjacent said point, whereby said offset portion will abut said extension means when said handle means are in open position.

3. Hand pressure roller which comprises roller means, a pair of handle means, said handle means having additional means rotatably securing said handle means to said roller means and pivotally securing said handle means for movement outwardly and inwardly with respect to each other, at least a portion of said additional means rotatably abutting a portion of the roller means for transmitting pressure exerted on both the handle means to said roller means at said abutting portions, and means for limiting the outward pivotal movement of the handle means under the resultant pressure exerted on both the handle means, said means for limiting the outward pivotal movement including adjacent stop means provided on at least one side of said roller means, said stop means being mounted for rotation on said rotatably securing means and extending on either side of said rotatably securing means and a slight distance thereabove, whereby said handle means will abut the corresponding stop means on either side of said rotatably securing means at the outermost position of said handles with respect to each other.

4. Hand pressure roller which comprises roller means, a pair of handle means, said handle means having additional means rotatably securing said handle means to said roller means and pivotally securing said handle means for movement outwardly and inwardly with respect to each other, at least a portion of said additional means rotatably abutting a portion of the roller means for transmitting pressure exerted on both the handle means to said roller means at said abutting portions, and means for limiting the outward pivotal movement of the handle means under the resultant pressure exerted on both the handle means, said additional means for rotatably securing said handle means to said roller means and for pivotally securing said handle means for movement outwardly and inwardly with respect to each other including axle bearing means located on at least one side of said roller means substantially along a portion of the axis of rotation thereof, said handle means being rotatably and pivotally mounted on said axle bearing means, upwardly diverging stop means being additionally rotatably mounted on said axle bearing means.

5. Hand pressure roller which comprises roller means, a pair of handle means, said handle means having additional means rotatably securing said handle means to said roller means, and pivotally securing said handle means for movement outwardly and inwardly with respect to each other, at least a portion of said additional means rotatably abutting a portion of the roller means for transmitting pressure exerted on both the handle means to said roller means at said abutting portions, and means for limiting the outward pivotal movement of the handle means under the resultant pressure exerted on both the handle means, said handle means being movable inwardly with respect to each other, to the extent that said handle means substantially abut one another along their common extent.

6. Hand pressure roller which comprises roller means, a pair of handle means, said handle means having additional means rotatably securing said handle means to said roller means and pivotally securing said handle means for movement outwardly and inwardly with respect to each other, at least a portion of said additional means rotatably abutting a portion of the roller means for transmitting pressure exerted on both the handle means to said roller means at said abutting portions, and means for limiting the outward pivotal movement of the handle means under the resultant pressure exerted on both the handle means, said means for limiting the outward pivotal movement including a collapsible arm means secured at either end to said handle means, said arm means having hinge connection means thereon, said hinge connection means being provided with means for locking said connection in open position.

References Cited in the file of this patent

UNITED STATES PATENTS

| | | |
|---|---|---|
| 756,695 | Peterson | Apr. 5, 1904 |
| 1,123,453 | Witte | Jan. 5, 1915 |
| 1,381,476 | Lane | June 14, 1921 |
| 1,827,003 | Gailhofer | Oct. 13, 1931 |
| 2,273,710 | Klaes | Feb. 17, 1942 |
| 2,800,715 | Cohen | July 30, 1951 |

FOREIGN PATENTS

| | | |
|---|---|---|
| 11,840 | Great Britain | of 1890 |

UNITED STATES PATENT OFFICE
CERTIFICATE OF CORRECTION

Patent No. 3,098,783            July 23, 1963

Dieter Busch et al.

It is hereby certified that error appears in the above numbered patent requiring correction and that the said Letters Patent should read as corrected below.

Column 5, after line 12, insert the following claim:

7. Hand pressure roller according to claim 2 wherein said additional means for rotatably securing said handle means to said roller means and for pivotally securing said handle means for movement outwardly and inwardly with respect to each other comprises axle means passing through said roller means substantially along the axis of rotation thereof and outwardly extending past each roller side a slight distance, said handle means being rotatably and pivotally mounted on said axle means extending past each of said roller sides.

Signed and sealed this 21st day of January 1964.

(SEAL)
Attest:

ERNEST W. SWIDER            EDWIN L. REYNOLDS

Attesting Officer            Acting Commissioner of Patents